United States Patent
Langensiepen et al.

(10) Patent No.: US 9,676,651 B2
(45) Date of Patent: Jun. 13, 2017

(54) PULL-ROLL CARTRIDGES FOR USE IN GLASS MANUFACTURING PROCESSES AND METHODS FOR MAKING AND USING THE SAME

(71) Applicant: Corning Incorporated, Corning, NY (US)

(72) Inventors: Ralph Alfred Langensiepen, Cape Coral, FL (US); Brandon Thomas Sternquist, Corning, NY (US); Lewis Kirk Klingensmith, Corning, NY (US); Eric Joseph Teator, Corning, NY (US); Izhar Zahoor Ahmed, Painted Post, NY (US); Do-Hun Lee, Asan-si (KR)

(73) Assignee: Corning Incorporated, Corning, NY (US)

(\*) Notice: Subject to any disclaimer, the term of this patent is extended or adjusted under 35 U.S.C. 154(b) by 4 days.

(21) Appl. No.: 14/454,278

(22) Filed: Aug. 7, 2014

(65) Prior Publication Data

US 2016/0039704 A1   Feb. 11, 2016

(51) Int. Cl.
   *C03B 17/06*   (2006.01)
(52) U.S. Cl.
   CPC .......... *C03B 17/068* (2013.01); *C03B 17/064* (2013.01)
(58) Field of Classification Search
   CPC .... C03B 17/064; C03B 17/068; C03B 35/186
   See application file for complete search history.

(56) References Cited

U.S. PATENT DOCUMENTS

| | | | | |
|---|---|---|---|---|
| 1,612,990 A | * | 1/1927 | Silverstein | D06F 83/00 122/20 A |
| 3,961,012 A | * | 6/1976 | DiMaio | B29C 70/28 264/112 |
| 4,751,776 A | * | 6/1988 | Reunamaki | B65G 23/04 29/426.6 |

(Continued)

FOREIGN PATENT DOCUMENTS

| | | |
|---|---|---|
| JP | 2008/266070 A | 4/2007 |
| WO | 2010111341 A1 | 9/2010 |
| WO | 2013052026 A1 | 4/2013 |

OTHER PUBLICATIONS

Korean Intellectual Property Office; International Search Report; Mail Date: Oct. 28, 2015; pp. 1-3.

*Primary Examiner* — Erin Snelting
(74) *Attorney, Agent, or Firm* — Kevin M. Able; Christopher Elswick

(57) ABSTRACT

A cartridge assembly includes a hub portion having a first end and a second end, a first retaining ring portion including a first snap ring and a first retaining ring member, and a second retaining ring portion including a second snap ring and a second retaining ring member. The cartridge assembly further includes a plurality of disc elements positioned between the first retaining ring portion and the second retaining ring portion, where the plurality of disc elements has an outer diameter that is greater than an outer diameter of the first retaining ring portion and the second retaining ring portion, and a plurality of fastening members positioned at the first end and the second end of the hub portion, the plurality of fastening members extending radially inward from the hub portion.

14 Claims, 9 Drawing Sheets

(56) References Cited

U.S. PATENT DOCUMENTS

| | | | |
|---|---|---|---|
| 6,716,147 B1* | 4/2004 | Hinkle | C03B 35/18 |
| | | | 29/895.21 |
| 6,896,646 B2 | 5/2005 | Kaiser et al. | |
| 8,549,753 B2 | 10/2013 | Neubauer | |
| 8,820,120 B2* | 9/2014 | Cook | C03B 17/068 |
| | | | 65/370.1 |
| 8,991,216 B2* | 3/2015 | Gallagher | C03B 17/068 |
| | | | 492/33 |
| 9,016,093 B2* | 4/2015 | Ahmed | C03B 17/068 |
| | | | 492/33 |
| 9,285,347 B2* | 3/2016 | Satake | B01D 19/0063 |
| 2003/0181302 A1 | 9/2003 | Kaiser et al. | |
| 2007/0042883 A1* | 2/2007 | Daily | C03B 35/181 |
| | | | 492/40 |
| 2010/0113238 A1 | 5/2010 | Horiuchi et al. | |
| 2010/0292062 A1 | 11/2010 | Neubauer | |
| 2012/0297836 A1* | 11/2012 | Cook | C03B 17/068 |
| | | | 65/370.1 |
| 2014/0060116 A1* | 3/2014 | Langensiepen | C03B 17/064 |
| | | | 65/53 |
| 2014/0130550 A1* | 5/2014 | Ahmed | C03B 17/068 |
| | | | 65/90 |
| 2014/0130551 A1* | 5/2014 | Gallagher | C03B 17/068 |
| | | | 65/90 |
| 2014/0352356 A1* | 12/2014 | Anderson | C03B 17/068 |
| | | | 65/91 |
| 2016/0039704 A1* | 2/2016 | Langensiepen | C03B 17/068 |
| | | | 65/53 |

* cited by examiner

PULL-ROLL CARTRIDGES FOR USE IN GLASS MANUFACTURING PROCESSES AND METHODS FOR MAKING AND USING THE SAME

BACKGROUND

Field

The present specification generally relates to pulling rolls for use in the manufacture of sheet glass in a glass manufacturing process.

Technical Background

Pulling rolls are used in the manufacture of sheet glass to apply a vertical pulling force to a ribbon or web of glass from which individual sheets are formed. The amount of pulling force applied by the pulling rolls to the glass is utilized to control the nominal thickness of the glass as the glass is drawn from molten glass, such as in an overflow downdraw fusion process, as described in U.S. Pat. Nos. 3,338,696 and 3,682,609, or a similar process. In addition to a main pulling roll, additional rolls are sometimes used in ribbon drawing processes to stabilize ribbon motion, or to create horizontal tension across the glass ribbon. Though generically referred to as pulling rolls, these rolls can sometimes be run without drive motors so that the rolls rotate through the contact with the moving glass ribbon. Whether actively driven or passively driven, rolls which contact the ribbon during the drawing process are referred to as pulling rolls.

When pulling rolls are used to draw molten glass, the relatively high temperature of the molten glass may cause the portion of the pulling roll in contact with the molten glass to degrade. Over time, the pulling roll and/or the portion of the pulling roll in contact with the molten glass must be replaced, causing process down time and increased manufacturing costs.

Accordingly, alternative pulling roll designs are needed.

SUMMARY

According to one embodiment a cartridge assembly for a glass web pulling roll includes a hub portion having a first end and a second end positioned opposite the first end in a cartridge axial direction, a first retaining ring portion including a first snap ring and a first retaining ring member, the first retaining ring portion positioned proximate to the first end of the hub portion, a second retaining ring portion including a second snap ring and a second retaining ring member, the second retaining ring portion positioned proximate to the second end of the hub portion, a plurality of disc elements positioned between the first retaining ring portion and the second retaining ring portion, where the plurality of disc elements has an outer diameter that is greater than an outer diameter of the first retaining ring portion and the second retaining ring portion, and a plurality of fastening members positioned at the first end and the second end of the hub portion, the plurality of fastening members extending radially inward from the hub portion.

In another embodiment, a glass web pulling roll includes a shaft member, a cartridge assembly positioned on the shaft member, the cartridge assembly including a hub portion having a first end and a second end positioned opposite the first end in a cartridge axial direction, a first retaining ring portion including a first snap ring and a first retaining ring member, the first retaining ring portion positioned proximate to the first end of the hub portion, a second retaining ring portion including a second snap ring and a second retaining ring member, the second retaining ring portion positioned proximate to the second end of the hub portion, a plurality of disc elements positioned between the first retaining ring portion and the second retaining ring portion, where the plurality of disc elements has an outer diameter that is greater than an outer diameter of the first retaining ring portion and the second retaining ring portion, and a plurality of fastening members positioned at the first end and the second end of the hub portion, the plurality of fastening members extending radially inward from the hub portion.

In yet another embodiment, a method for drawing a glass web includes melting glass batch materials to form molten glass, forming the molten glass into the glass web with a fusion draw machine including an inlet, a forming vessel, and a pulling roll, and drawing the glass web through the pulling roll, the pulling roll including a shaft member, a cartridge assembly positioned on the shaft member, the cartridge assembly including a hub portion having a first end and a second end positioned opposite the first end in a cartridge axial direction, a first retaining ring portion including a first snap ring and a first retaining ring member, the first retaining ring portion positioned proximate to the first end of the hub portion, a second retaining ring portion including a second snap ring and a second retaining ring member, the second retaining ring portion positioned proximate to the second end of the hub portion, a plurality of disc elements positioned between the first retaining ring portion and the second retaining ring portion, where the plurality of disc elements has an outer diameter that is greater than an outer diameter of the first retaining ring portion and the second retaining ring portion, and a plurality of fastening members positioned at the first end and the second end of the hub portion, the plurality of fastening members extending radially inward from the hub portion.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2A:
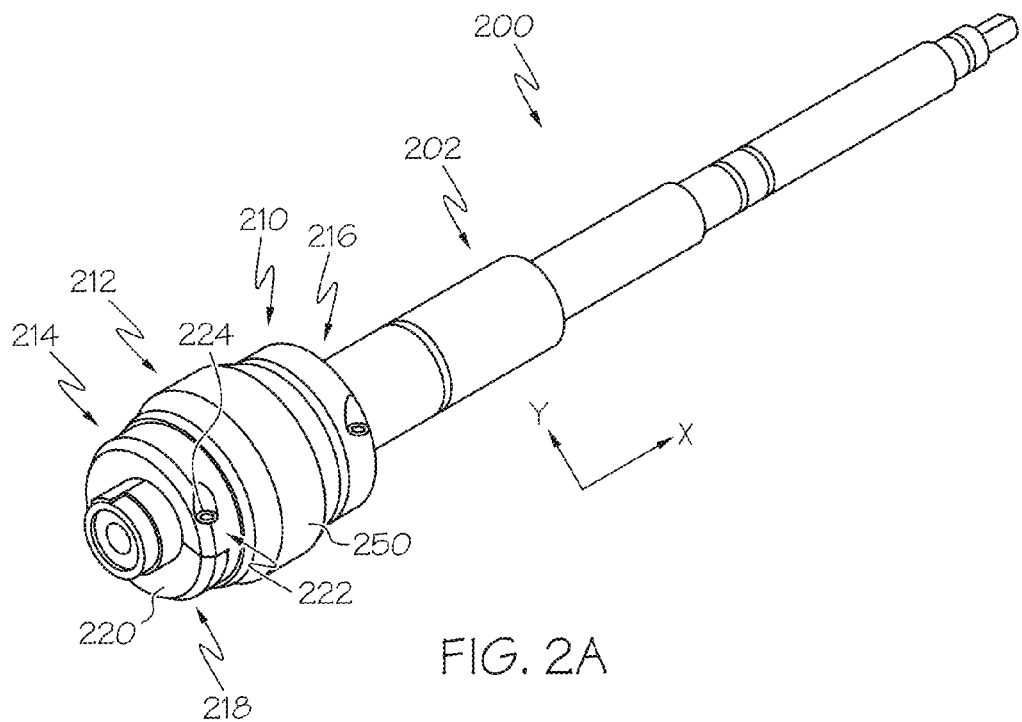
FIG. 2A schematically depicts a perspective view of a pulling roll for drawing glass ribbons, according to one or more embodiments shown or described herein.

Reference will now be made in detail to various embodiments of cartridge assemblies for use in the manufacture of glass sheets and methods for making and using the pulling rolls. Whenever possible, the same reference numerals will be used throughout the drawings to refer to the same or like parts. One embodiment of a cartridge assembly is schematically depicted in FIG. 2A. The cartridge assembly may include a first end and a second end, and a glass contact portion positioned between the first end and the second end. In some embodiments, the cartridge assembly may be coupled to a shaft member of the pulling roll by a clamping portion. In other embodiments, the cartridge assembly may be coupled to the shaft member of the pulling roll by a plurality of fasteners. The cartridge assemblies and methods for positioning a cartridge assembly on a shaft member will be described in further detail herein with specific reference to the appended drawings.

Glass sheet materials may generally be formed by melting glass batch materials to form molten glass and forming the molten glass into a glass ribbon. Exemplary processes include the float glass process, the slot draw process and the fusion downdraw process. In each of these processes, one or more pulling rolls may be utilized to contact the glass and convey the glass in a downstream direction.

Figure 1A:
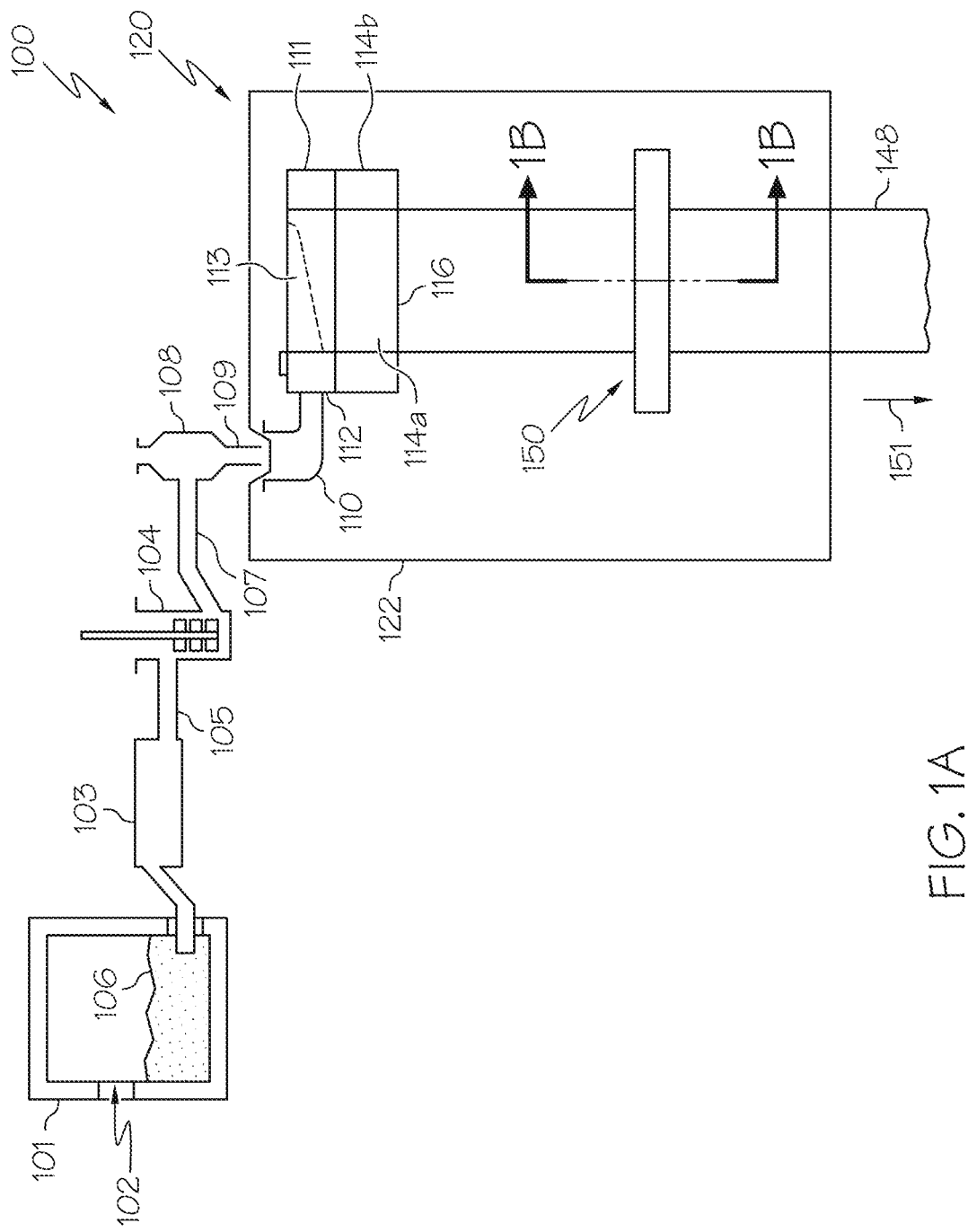
FIG. 1A schematically depicts an apparatus for forming glass ribbons from molten glass, according to one or more embodiments shown or described herein.

Referring to FIG. 1A by way of example, an exemplary glass manufacturing apparatus 100 for forming glass ribbons from molten glass is schematically depicted in which a fusion draw machine is used to form the molten glass into glass ribbons. The glass manufacturing apparatus 100 includes a melting vessel 101, a fining vessel 103, a mixing vessel 104, a delivery vessel 108, and a fusion draw machine (FDM) 120. Glass batch materials are introduced into the melting vessel 101 as indicated by arrow 102. The batch materials are melted to form molten glass 106. The fining vessel 103 has a high temperature processing area that receives the molten glass 106 from the melting vessel 101 and in which bubbles are removed from the molten glass 106. The fining vessel 103 is fluidly coupled to the mixing vessel 104 by a connecting tube 105. That is, molten glass flowing from the fining vessel 103 to the mixing vessel 104 flows through the connecting tube 105. The mixing vessel 104 is, in turn, fluidly coupled to the delivery vessel 108 by a connecting tube 107 such that molten glass flowing from the mixing vessel 104 to the delivery vessel 108 flows through the connecting tube 107.

The delivery vessel 108 supplies the molten glass 106 through a downcomer 109 into the FDM 120. The FDM 120 comprises an enclosure 122 in which an inlet 110, a forming vessel 111 and at least one draw assembly 150 are positioned. As shown in FIG. 1A, the molten glass 106 from the downcomer 109 flows into an inlet 110 which leads to the forming vessel 111. The forming vessel 111 includes an opening 112 that receives the molten glass 106 which flows into a trough 113 and then overflows and runs down two converging sides 114a and 114b before fusing together at a root, where the two sides join, before being contacted and drawn in a downstream direction 151 by the draw assembly 150 to form a continuous glass ribbon 148.

While the pulling rolls 200 have been described herein as being used in conjunction with an apparatus which utilizes a fusion draw machine to form the glass ribbon, it should be understood that the pulling rolls may be used with similar processes in which glass batch materials are melted to form molten glass and the molten glass is then formed into a glass ribbon. By way of example and not limitation, the pulling rolls described herein may also be utilized in conjunction with up-draw processes, slot-draw processes, float-draw processes and other, similar processes.

Figure 1B:
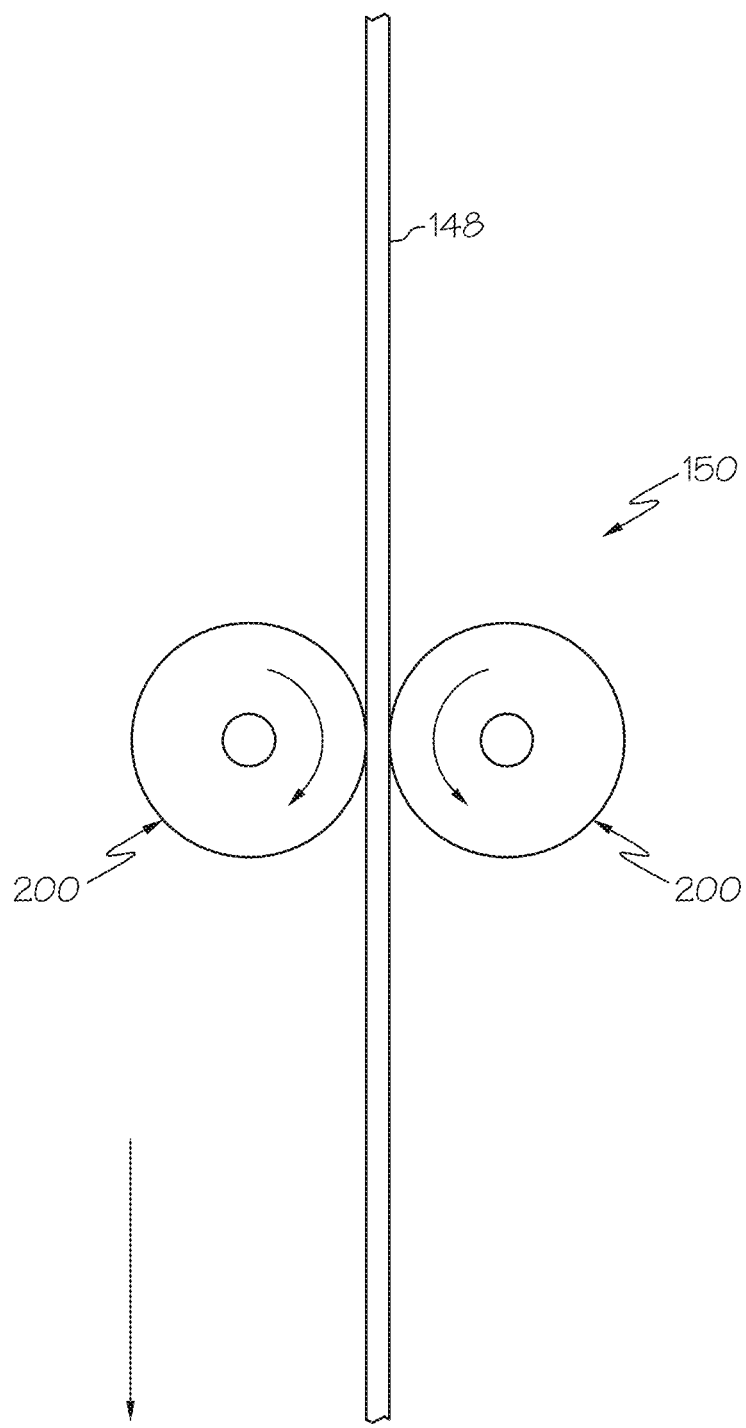
FIG. 1B schematically depicts a cross-section of a draw assembly for use in drawing a glass ribbon, according to one or more embodiments shown or described herein.

Referring to FIG. 1B, a cross section of the draw assembly 150 is schematically depicted. As shown in FIG. 1B, the draw assembly 150 generally comprises a pair of opposed pulling rolls 200 which contact the glass ribbon 148 on opposite sides. The pulling rolls 200 may be powered (i.e., the pulling rolls 200 are actively rotated and thus impart a drawing force which conveys the glass ribbon 148 in the downstream direction 151) or passive (i.e., the pulling rolls 200 contact the glass ribbon 148 and stabilize the glass ribbon as it is drawn in the downstream direction 151 by other pulling rolls).

Figure 2B:
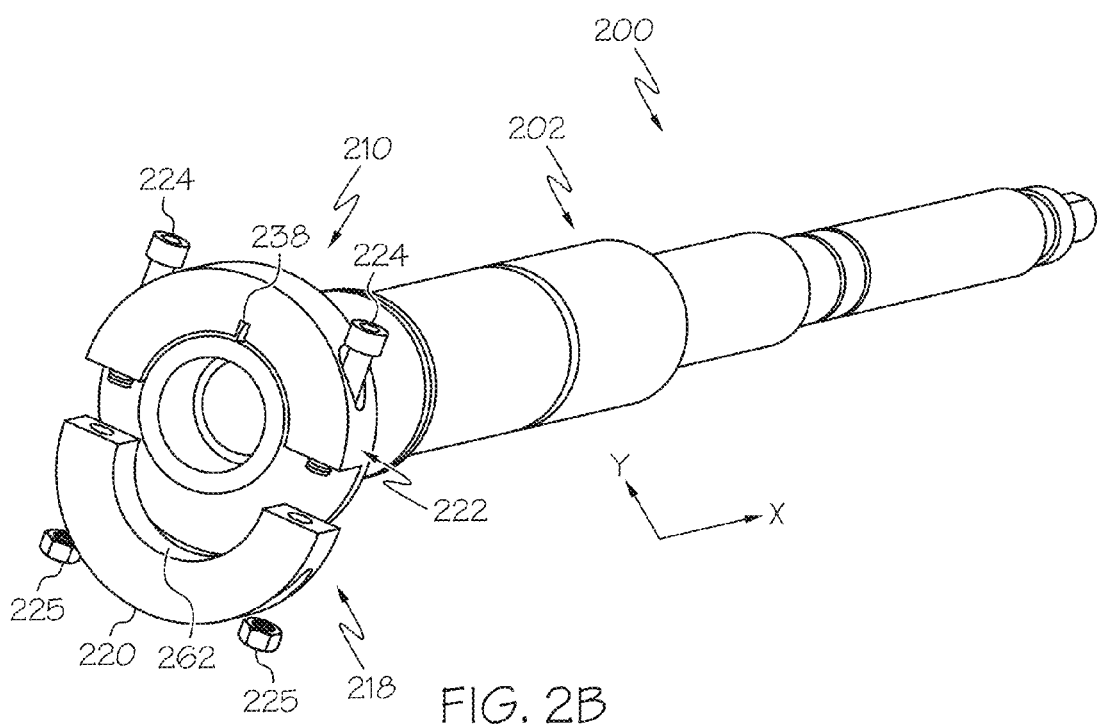
FIG. 2B schematically depicts a perspective view of a pulling roll for drawing glass ribbons, according to one or more embodiments shown or described herein.
Figure 3:
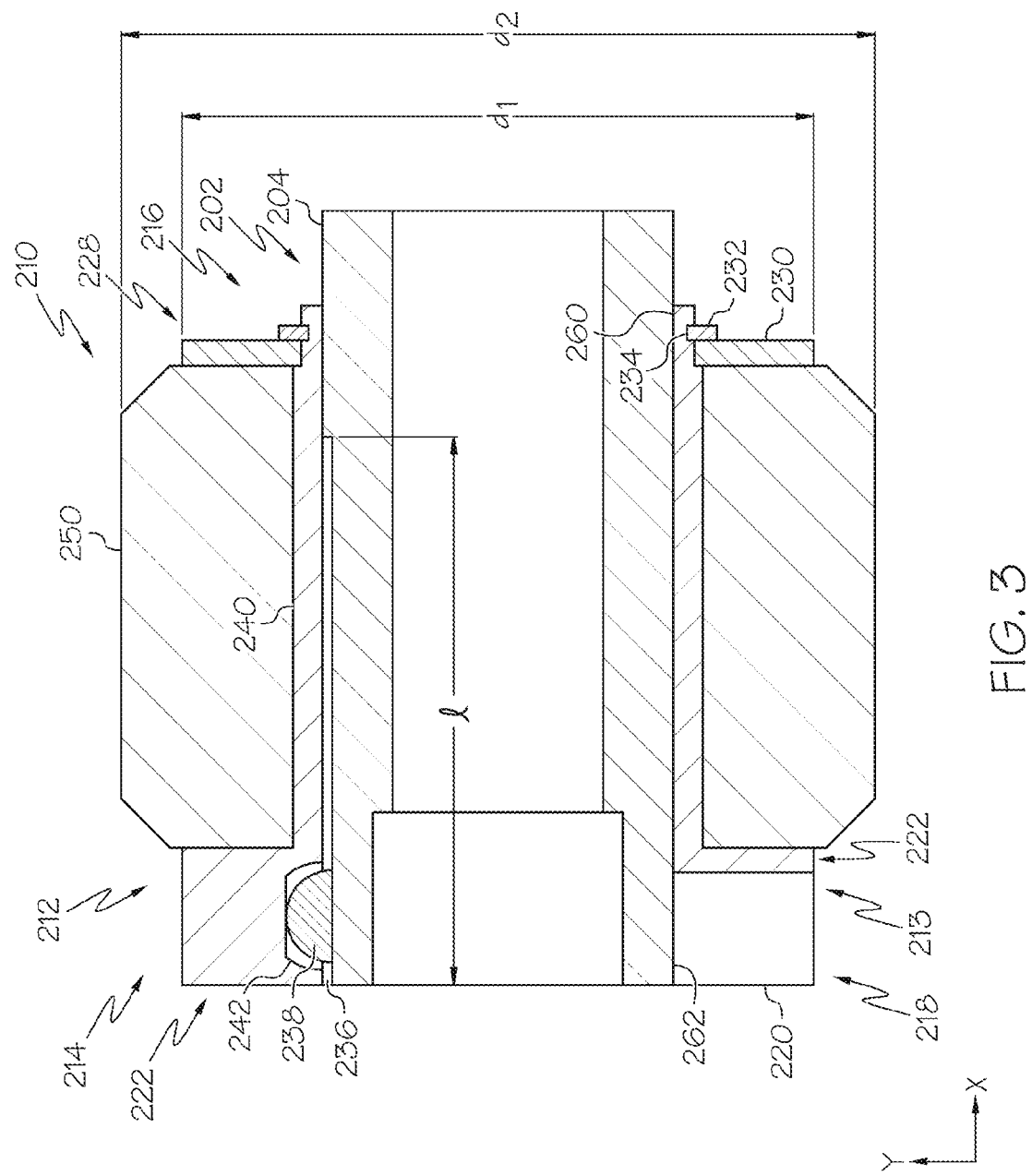
FIG. 3 schematically depicts a cross-section view of a cartridge assembly for drawing glass ribbons, according to one or more embodiments shown or described herein.

Referring now to FIGS. 2A, 2B, and 3 an exemplary pulling roll 200 for use in drawing glass ribbons is schematically depicted. The pulling roll 200 general includes a cartridge assembly 210 positioned on a shaft member 202. The cartridge assembly 210 includes a hub portion 212. The hub portion 212 includes an inner circumference 260 that may be positioned on an outer circumference 204 of the shaft member 202. In embodiments, the inner circumference 260 of the hub portion 212 is nominally larger than the outer circumference 204 of the shaft member 202. Because the inner circumference 260 of the hub portion 212 is nominally larger than the outer circumference 204 of the shaft member 202, the hub portion 212 may slide relative to the shaft member 202 in a cartridge axial direction (i.e., in the +/−X-direction depicted in FIGS. 2A-3).

The hub portion 212 of the cartridge assembly 210 includes a first end 214 and a second end 216 positioned opposite the first end 214 in the cartridge axial direction. The first end 214 may include a flange portion 218. The flange portion 218 of the of the hub portion 212 extends radially outward from a body 240 of the hub portion 212. The flange portion 218 may include a rim portion 222 and a clamping portion 220. The rim portion 222 may extend around the circumference of the hub portion 212, as depicted in FIG. 3. The clamping portion 220 of the flange portion 218 may extend partially around a circumference 213 of the hub portion 212, forming a c-shape as depicted in FIG. 2B.

In embodiments, the clamping portion 220 may be a separate piece fastened to the rim portion 222. In embodiments, the clamping portion 220 is fastened to the rim portion 222 by at least one fastener 224. The at least one fastener 224 extends through the rim portion 222 and at least partially through the clamping portion 220. The at least one fastener 224 engages with at least one nut 225, as depicted in FIG. 2B. Alternatively, the at least one fastener 224 may engage threads (not depicted) in the clamping portion 220 without the use of a nut 225.

When the at least one fastener 224 is tightened, the at least one fastener 224 draws the clamping portion 220 in a radially inward direction, such that a concave surface 262 of the clamping portion 220 engages the outer circumference 204 of the shaft member 202. In this way, the at least one fastener 224 may reduce an effective inner circumference of the clamping portion 220 such that the effective inner circumference of the clamping portion 220 is less than the outer circumference 204 of the shaft 202. Because the concave surface 262 of the clamping portion 220 engages the outer circumference 204, the clamping portion 220 restricts both the axial and rotational movement of the cartridge assembly 210 with respect to the shaft member 202. Accordingly, the cartridge assembly 210 may be fixedly coupled to the shaft member 202 through the clamping portion 220 and the at least one fastener 224.

Conversely, when the at least one fastener 224 is loosened, the concave surface 262 of the clamping portion 220 disengages and may be spaced apart from the outer circumference 204 of the shaft member 202. As described above, the inner circumference 260 of the hub portion 212 is larger than the outer circumference 204 of the shaft member 202 allowing the hub portion 212 to slide relative to the shaft member 202. Accordingly, because the concave surface 262 of the clamping portion 220 is not engaged with the outer circumference 204 of the shaft member 202 when the at least one fastener 224 is not tightened or is loosened, the hub portion 212 may slide relative to the shaft member 202 in the cartridge axial direction. In this way, the cartridge assembly 210 may be fixedly coupled at various locations of the shaft member 202 in the axial direction.

Referring to FIG. 3, the second end 216 of the hub portion 212 may include a retaining ring portion 228 positioned proximate to the second end 216. The retaining ring portion 228 may include a retaining ring member 230. The retaining ring portion 228 may further include a snap ring 232 positioned proximate to the retaining ring member 230. The snap ring 232 may be positioned at least partially within a snap ring groove 234 formed in the hub portion 212. The snap ring groove 234 may be at least partially recessed from the body 240 of the hub portion 212. The snap ring 232 may be positioned at least partially within the snap ring groove 234 of the hub portion 212 such that the snap ring groove 234 restricts movement of the snap ring 232 in the cartridge axial direction. In turn, the snap ring 232 restricts movement of the retaining ring member 230 in the cartridge axial direction. More specifically, the snap ring 232 may create a mechanical interference with the retaining ring member 230, restricting movement of the retaining ring member 230 in the cartridge axial direction (i.e., in the +X-direction depicted in FIG. 3).

Still referring to FIG. 3, the cartridge assembly 210 may include a glass contact portion 250. The glass contact portion 250 is positioned between the flange portion 218 of the first end 214 and the retaining ring portion 228 of the second end 216. In embodiments, the glass contact portion 250 may include a plurality of discs (not depicted) compressed in the cartridge axial direction between the flange portion 218 and the retaining ring portion 228 of the hub portion 212. The glass contact portion 250 has an outer diameter d2. The outer diameter d2 of the glass contact portion 250 is greater than an outer diameter d1 of the retaining ring portion 228 and the flange portion 218. Because the glass contact portion 250 has an outer diameter d2 that is greater than the outer diameter d1 of the retaining ring portion 228 and the flange portion 218, when the cartridge assembly 210 is brought into contact with the glass ribbon 148, only the glass contact portion 250 will contact the glass ribbon 148.

The plurality of discs (not depicted) may be formed from millboard, Mica paper, or another similar material suitable for use at elevated temperatures. In some embodiments, SD-115 millboard may be used, available from Nichias Corporation, Tokyo, Japan. In embodiments using Mica paper, the Mica paper may be generally configured as described in U.S. patent application Ser. No. 13/477,719 assigned to Corning Inc. In embodiments, the plurality of discs (not depicted) of the glass contact portion 250 may be compressed to achieve desired material properties, such as a hardness of the glass contact portion 250. In some embodiments, the plurality of discs (not depicted) is compressed by a force that is greater than 2000 lbf. In other embodiments, the plurality of discs (not depicted) of the glass contact portion 450 may be compressed by a force that is greater than 2500 lbf.

In some embodiments, the cartridge assembly 210 may include a key portion 238. Specifically, the hub portion 212 may include a keyway 242, and the shaft member 202 may include a key slot 236. The key portion 238 may be positioned at least partially within both the keyway 242 and the key slot 236. Because the key portion 238 is positioned within the keyway 242 of the hub portion 212 and the key slot 236 of the shaft member 202, the key portion 238 restricts rotation of the hub portion 212 with respect to the shaft member 202 and vice versa.

In embodiments, the key slot 236 of the shaft member 202 may extend a length l along the outer circumference 204 of the shaft member 202 in the cartridge axial direction. Because the key slot 236 extends the length l along the outer circumference 204 of the shaft member 202, the key portion 238 may remain at least partially within the key slot 236 as the hub portion 212 is translated in the cartridge axial direction, restricting a rotation of the hub portion 212 with respect to the shaft member 202 when the hub portion 212 is at different positions in the cartridge axial direction.

Figure 4:
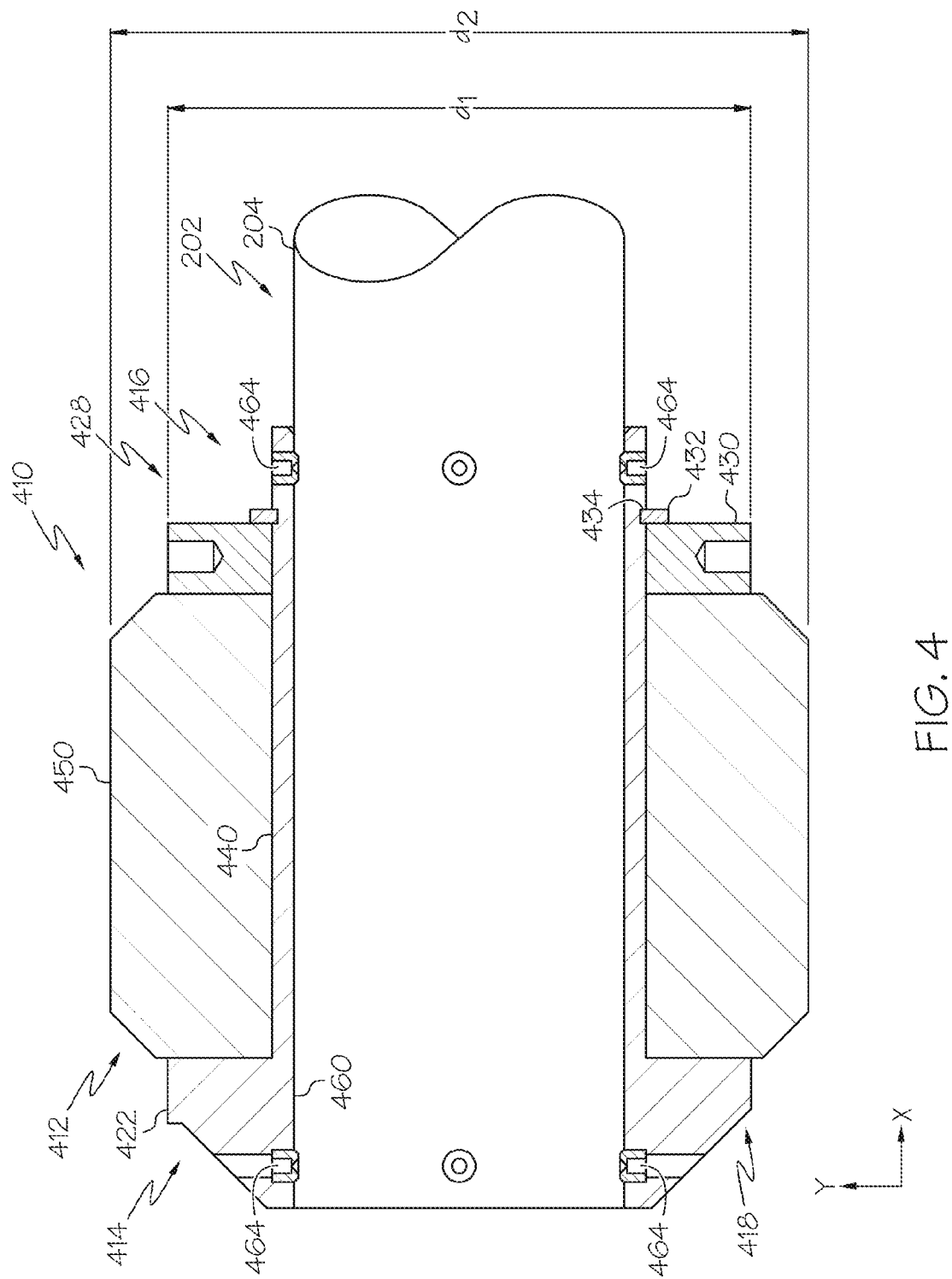
FIG. 4 schematically depicts a cross-section view of a cartridge assembly for drawing glass ribbons, according to one or more embodiments shown or described herein.

Referring now to FIG. 4, another embodiment of a cartridge assembly 410 is depicted. In this embodiment, the cartridge assembly 410 includes a flange portion 418 and a retaining ring portion 428, as described above with respect to FIGS. 2A-3. However, in this embodiment, the cartridge assembly 410 includes a plurality of fastening members 464.

As described above, the cartridge assembly 410 includes a hub portion 412. The hub portion 412 includes an inner circumference 460 that may be positioned on an outer circumference 204 of the shaft member 202. In embodiments, the inner circumference 460 of the hub portion 412 is nominally larger than the outer circumference 204 of the shaft member 202. Because the inner circumference 460 of the hub portion 412 is nominally larger than the outer circumference 204 of the shaft member 202, the hub portion 412 may slide relative to the shaft member 202 in a cartridge axial direction (i.e., in the +/−X-direction depicted in FIG. 4).

The hub portion 412 includes a plurality of fastening members 464 positioned at the first end 414 and the second end 416 of the hub portion 412. The plurality of fastening members 464 extend radially inward from the hub portion 412. More specifically, the plurality of fastening members 464 may selectively be translated in a radially inward direction, or translated in a radially outward direction from the hub portion 412. When the plurality of fastening members 464 are translated radially inward, the plurality of fastening members 464 engage the outer circumference 204 of the shaft member 202. The engagement between the plurality of fastening members 464 and the outer circumference 204 of the shaft member 202 restricts axial and rotational movement of the cartridge assembly 410 with respect to the shaft member 202. Accordingly, the cartridge assembly 410 may be coupled to the shaft member 202 through the plurality of fastening members 464.

Conversely, when the plurality of fastening members 464 are not translated radially inward, the plurality of fastening members 464 may not engage the outer circumference 204 of the shaft member 202. As described above, the inner circumference 460 of the hub portion 412 is larger than the outer circumference 204 of the shaft member 202, allowing the hub portion 412 to slide relative to the shaft member 202. Accordingly, because the fastening members 464 do not engage the outer circumference 204 of the shaft member 202 when the fastening members 464 are not translated radially inward, the hub portion 412 may slide relative to the shaft member 202 in the cartridge axial direction. In this way, the cartridge assembly 410 may be fixedly coupled at various locations along the shaft member 202 in the axial direction.

In embodiments, the plurality of fastening members 464 may include fasteners such as set screws, pins, or the like. When the plurality of fastening members 464 include set screws, the plurality of fastening members 464 may be selectively translated radially inward and radially outward from the hub portion 412 by selectively tightening and loosening the set screws.

As described above, the hub portion 412 of the cartridge assembly 410 includes a first end 414 and a second end 416 positioned opposite the first end 414 in the cartridge axial direction. The first end 414 may include a flange portion 418 that extends radially outward from a body 440 of the hub portion 412.

The second end 416 of the hub portion 412 may include a retaining ring portion 428 positioned proximate to the second end 416. The retaining ring portion 428 may include a retaining ring member 430. The retaining ring portion 428 may further include a snap ring 432 positioned proximate to the retaining ring member 430. The snap ring 432 may be positioned at least partially within a snap ring groove 434 formed in hub portion 412. The snap ring groove 434 may be at least partially recessed from the body 440 of the hub portion 412. The snap ring 432 may be positioned at least partially within the snap ring groove 434 of the hub portion 412 such that the snap ring groove 434 restricts movement of the snap ring 432 in the cartridge axial direction. In turn, the snap ring 432 restricts movement of the retaining ring member 430 in the cartridge axial direction. More specifically, the snap ring 432 may create a mechanical interference with the retaining ring member 430, restricting movement of the retaining ring member 430 in the cartridge axial direction (i.e., in the +X-direction depicted in FIG. 4).

Still referring to FIG. 4, the cartridge assembly 410 may include a glass contact portion 450. The glass contact portion 450 is positioned between the flange portion 418 of the first end 414 and the retaining ring portion 428 of the second end 416. In embodiments, the glass contact portion 450 may include a plurality of discs (not depicted) compressed between the flange portion 418 and the retaining ring portion 428 of the hub portion 412. The glass contact portion 450 has an outer diameter d2. The outer diameter d2 of the glass contact portion 450 is greater than an outer diameter d1 of the retaining ring portion 428 and the flange portion 418. Because the glass contact portion 450 has an outer diameter d2 that is greater than the outer diameter d1 of the retaining ring portion 428 and the flange portion 418, when the cartridge assembly 410 is brought into contact with the glass ribbon 148, only the glass contact portion 450 will contact the glass ribbon 148.

The plurality of discs (not depicted) may be formed from millboard, Mica paper, or similar material suitable for use at elevated temperatures. In some embodiments, SD-115 millboard may be used, available from Nichias Corporation, Tokyo, Japan. In embodiments, the plurality of discs (not depicted) of the glass contact portion 450 may be compressed to achieve desired material properties, such as a hardness of the glass contact portion 450. In some embodiments, the plurality of discs (not depicted) is compressed by a force that is greater than 2000 lbf. In other embodiments, the plurality of discs (not depicted) of the glass contact portion 450 may be compressed by a force that is greater than 2500 lbf.

Figure 5A:
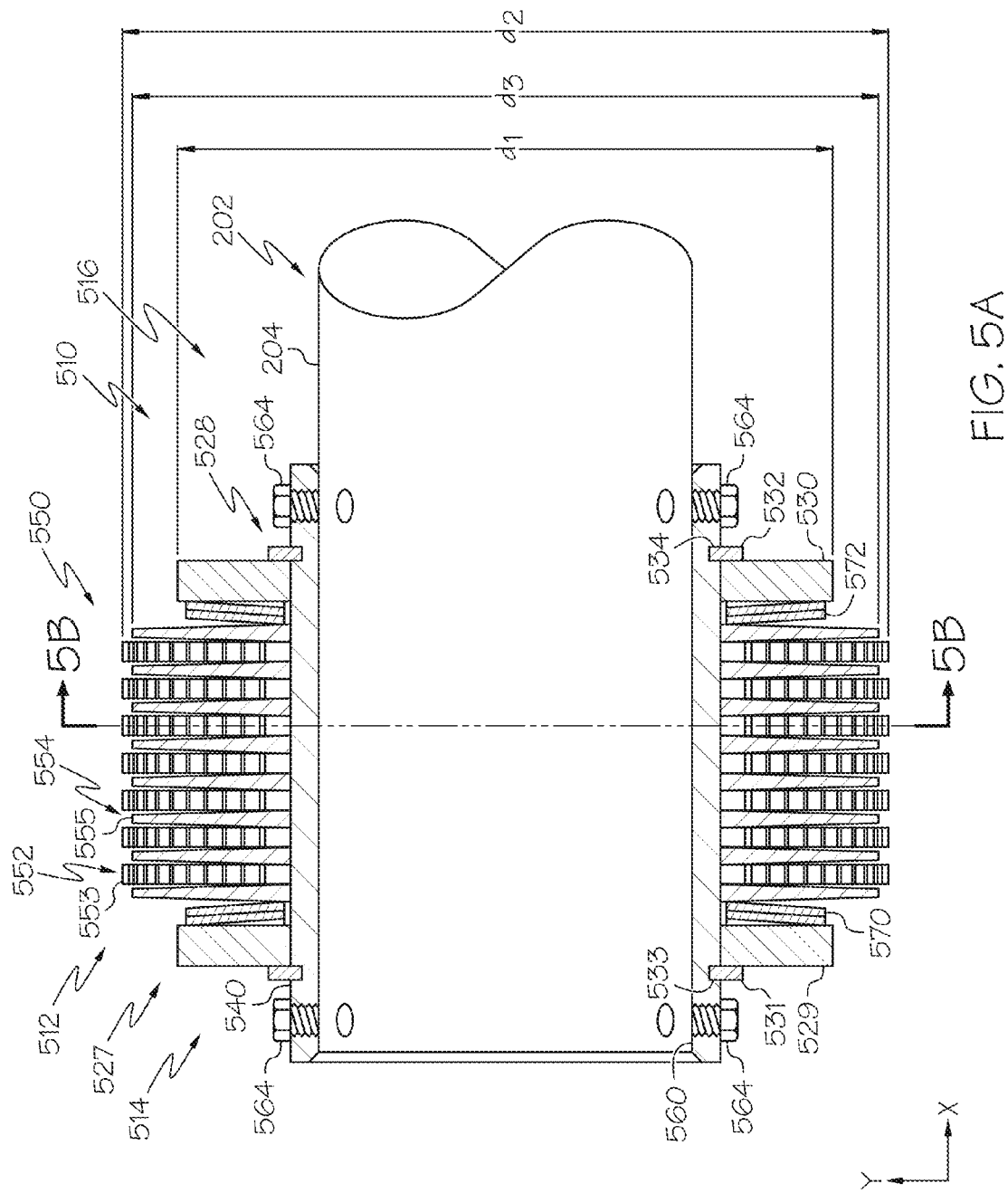
FIG. 5A schematically depicts a cross-section view of a cartridge assembly for drawing glass ribbons, according to one or more embodiments shown or described herein.

Referring now to FIG. 5A, another embodiment of a cartridge assembly 510 is depicted. In this embodiment, the cartridge assembly 510 includes a plurality of fastening members 564, similar to the embodiment described above with respect to FIG. 4. However, in this embodiment, the cartridge assembly further includes a first retaining ring portion 527 positioned proximate to the first end 514 of the hub portion 512 and a second retaining ring portion 528 positioned proximate to the second end 516 of the hub portion 512.

As described above, the cartridge assembly 510 includes a hub portion 512. The hub portion 512 includes an inner circumference 560 that may be positioned on an outer circumference 204 of the shaft member 202. In embodiments, the inner circumference 560 of the hub portion 512 is nominally larger than the outer circumference 204 of the shaft member 202. Because the inner circumference 560 of the hub portion 512 is nominally larger than the outer circumference 204 of the shaft member 202, the hub portion 512 may slide relative to the shaft member 202 in a cartridge axial direction (i.e., in the +/−X-direction depicted in FIG. 5A).

The hub portion 512 includes a plurality of fastening members 564 positioned at the first end 514 and the second end 516 of the hub portion 512. The plurality of fastening members 564 extend radially inward from the hub portion 512. More specifically, the plurality of fastening members 564 may selectively be translated in a radially inward direction, or translated in a radially outward direction from the hub portion 512. When the plurality of fastening members 564 are translated radially inward, the plurality of fastening members 564 engage the outer circumference 204 of the shaft member 202. The engagement between the plurality of fastening members 564 and the outer circumference 204 of the shaft member 202 restricts axial and rotational movement of the cartridge assembly 510 with respect to the shaft member 202. Accordingly, the cartridge assembly 510 may be coupled to the shaft member 202 through the plurality of fastening members 564.

Conversely, when the plurality of fastening members 564 are not translated radially inward, the plurality of fastening members 564 may not engage the outer circumference 204 of the shaft member 202. As described above, the inner circumference 560 of the hub portion 512 is larger than the outer circumference 204 of the shaft member 202, allowing the hub portion 512 to slide relative to the shaft member 202. Accordingly, because the fastening members 564 do not engage the outer circumference 204 of the shaft member 202 when the fastening members 564 are not translated radially inward, the hub portion 512 may slide relative to the shaft member 202 in the cartridge axial direction. In this way, the cartridge assembly 510 may be coupled at various locations along the shaft member 202 in the axial direction.

In embodiments, the plurality of fastening members 564 may include fasteners such as set screws, pins, or the like. When the plurality of fastening members 564 include set screws, the plurality of fastening members 564 may be selectively translated radially inward and radially outward from the hub portion 512 by selectively tightening and loosening the set screws.

As described above, the hub portion 512 of the cartridge assembly 510 includes a first end 514 and a second end 516 positioned opposite the first end 514 in the cartridge axial direction. The cartridge assembly 510 includes a first retaining ring portion 527 positioned proximate to the first end 514 of the hub portion 512.

The first retaining ring portion 527 may include a first retaining ring member 529. The first retaining ring portion 527 may further include a first snap ring 531 positioned proximate to the first retaining ring member 529. The snap ring 531 may be positioned at least partially within a first snap ring groove 533 formed in the hub portion 512. The first snap ring groove 533 may be at least partially recessed from a body 540 of the hub portion 512. The first snap ring 531 may be positioned at least partially within the first snap ring groove 533 of the hub portion 512 such that the first snap ring groove 533 restricts movement of the first snap ring 531 in the cartridge axial direction. In turn, the first snap ring 531 restricts movement of the first retaining ring member 529 in the cartridge axial direction. More specifically, the first snap ring 531 may create a mechanical interference with the first retaining ring member 529, restricting movement of the first retaining ring member 529 in the cartridge axial direction (i.e., in the −X-direction depicted in FIG. 5A).

Still referring to FIG. 5A, the cartridge assembly 510 includes a second retaining ring portion 528 positioned proximate to the second end 516 of the hub portion 512. The second retaining ring portion 528 may include a second retaining ring member 530. The second retaining ring portion 528 may further include a second snap ring 532 positioned proximate to the second retaining ring member 530. The snap ring 532 may be positioned at least partially within a second snap ring groove 534 formed in the hub portion 512. The second snap ring groove 534 may be at least partially recessed from the body 540 of the hub portion 512. The second snap ring 532 may be positioned at least partially within the second snap ring groove 534 of the hub portion 512 such that the second snap ring groove 534 restricts movement of the second snap ring 532 in the cartridge axial direction. In turn, the second snap ring 532 restricts movement of the second retaining ring member 530 in the cartridge axial direction. More specifically, the second snap ring 532 may create a mechanical interference with the second retaining ring member 530, restricting movement of the second retaining ring member 530 in the cartridge axial direction (i.e., in the +X-direction depicted in FIG. 5A).

Figure 5B:
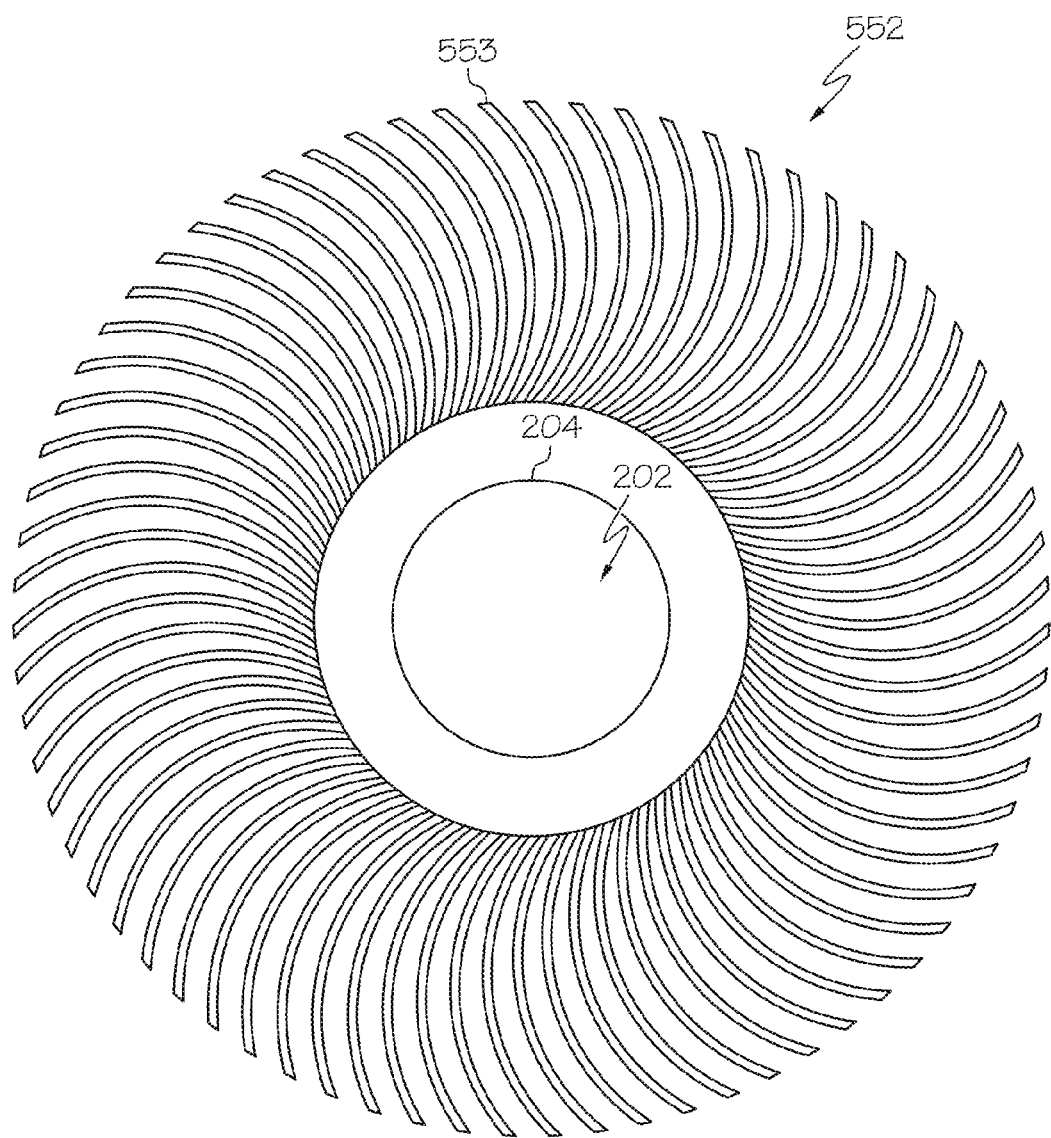
FIG. 5B schematically depicts a section view of a cartridge assembly for drawing glass ribbons, according to one or more embodiments shown or described herein.

Still referring to FIG. 5A, the cartridge assembly 510 may include a glass contact portion 550. The glass contact portion 550 is positioned between the first retaining ring portion 527 and the second retaining ring portion 528. Referring to FIGS. 5A and 5B, the glass contact portion 550 may include a plurality of disc elements 552 compressed between the first retaining ring portion 527 and the second retaining ring portion 528 in the cartridge axial direction. In embodiments, the plurality of disc elements 552 has an outer diameter d2 and an outer circumference 551. The outer diameter d2 of the plurality of disc elements 552 is greater than an outer diameter d1 of the first retaining ring portion 527 and the second retaining ring portion 528. Because the plurality of disc elements 552 has an outer diameter d2 that is greater than the outer diameter d1 of the first retaining ring portion 527 and second retaining ring portion 528, when the cartridge assembly 510 is brought into contact with the glass ribbon 148, only plurality of disc elements 552 will contact the glass ribbon 148.

Referring to FIG. 5B, in embodiments, the plurality of disc elements 552 may include a plurality of spring elements 553 extending radially outward from the hub portion 512 as described in WO 2013/052026 assigned to Corning Inc. The plurality of spring elements 553 may be biased in a radially outward direction and compliant in a radially inward direction. Because the plurality of spring elements 553 may be compliant in the radial direction, the plurality of disc elements 552 may contact the glass ribbon 148 without damaging the glass ribbon 148.

Referring to FIG. 5A, in embodiments, the glass contact portion 550 may further include a plurality of limiters 554 positioned between the first retaining ring portion 527 and the second retaining ring portion 528. Individual ones of the plurality of limiters 554 may be alternately arranged with individual ones of the plurality of disc elements 552, as depicted in FIG. 5A.

The plurality of limiters 554 may have an outer diameter d3 and an outer circumference 555. The outer diameter d3 of the plurality of limiters 554 may be less than the outer diameter d2 of the plurality of disc elements 552. Because the plurality of limiters 554 has an outer diameter d3 that is less than the outer diameter d2 of the plurality of disc elements 552, when the cartridge assembly 510 is brought into contact with the glass ribbon 148, only the outer circumference 551 of the plurality of disc elements 552 will nominally contact the glass ribbon 148.

In embodiments, the plurality of limiters 554 is relatively rigid in the radially inward direction compared to the plurality of disc elements 552. To provide the relative rigidity of the plurality of limiters 554, the plurality of limiters 554 may be formed from a solid, non-compliant material. Because the plurality of disc elements 552 has a greater diameter d2 than the diameter d3 of the plurality of limiters 554, the glass contact portion 550 may be compliant at positions between the outer circumference 555 of the plurality of limiters 554 and the outer circumference 551 of the plurality of disc elements 552 in the radial direction. However, because the plurality of limiters 554 is relatively rigid compared to the plurality of disc elements, the glass contact portion may be relatively rigid at positions radially inward from the outer circumference 555 of the plurality of limiters 554.

The plurality of limiters 554 and the plurality of disc elements 552 may be formed from materials suitable for use at elevated temperatures. In embodiments, the plurality of limiters 554 and the plurality of disc elements 552 may be formed from high temperature alloys, for example and without limitation, nickel-based alloys including Haynes 282 available from Haynes International Inc. and René 41. In embodiments, the plurality of limiters 554 may be formed from a different material than the plurality of disc elements 552. For example, in embodiments, the plurality of disc elements 552 may be formed from René 41, and the plurality of limiters 554 may be formed from Haynes 282. Alternatively, the plurality of disc elements 552 may be formed from millboard, Mica paper, or similar material suitable for use at elevated temperatures, similar to the embodiments described with respect to FIGS. 2A-4. In some embodiments, SD-115 millboard may be used, available from Nichias Corporation, Tokyo, Japan.

Still referring to FIG. 5A, the cartridge assembly 510 may further include a first biasing member 570. The first biasing member 570 may be positioned between the first retaining ring member 529 and the plurality of disc elements 552. The first biasing member 570 may apply a compressive force to the plurality of disc elements 552 in the cartridge axial direction. The cartridge assembly 510 may further include as second biasing member 572. The second biasing member 572 may be positioned between the plurality of disc elements 552 and the second retaining ring portion 528. The second biasing member 572 may apply a compressive force to the plurality of disc elements 552 in the cartridge axial direction opposite of the first biasing member. In this way, the second biasing member 572 and the first biasing member 570 may apply a compressive force to the plurality of disc elements 552 in the cartridge axial direction.

The first biasing member 570 and the second biasing member 572 may be formed from, for example and without limitation, a compression spring, a spring washer, or the like. In embodiments, the compression provided by the first biasing member 570 and/or the second biasing member 572 maintains the axial position of the plurality of disc elements 552 and/or the plurality of limiters 554. In embodiments including a plurality of limiters 554, the compressive force provided by the first and/or second biasing member 570, 572 assists the plurality of limiters 554 in restricting the compliance of the plurality of disc elements 552 in the radial direction. More specifically, the compressive force provided by the first and/or second biasing member 570, 572 increases friction between the plurality of limiters 554 and the plurality of disc elements 552, thereby restricting the compliance of the plurality of disc elements 552 in the radial direction.

Figure 6A:
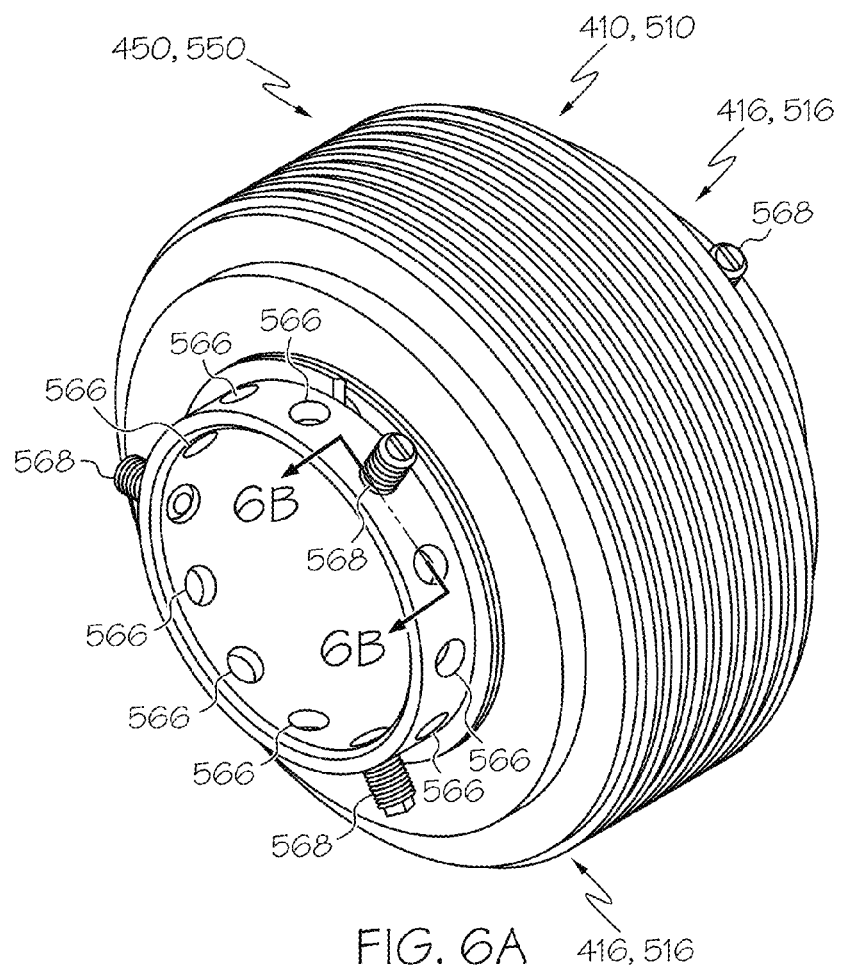
FIG. 6A schematically depicts a perspective view of a cartridge assembly for drawing glass ribbons, according to one or more embodiments shown or described herein.
Figure 6B:
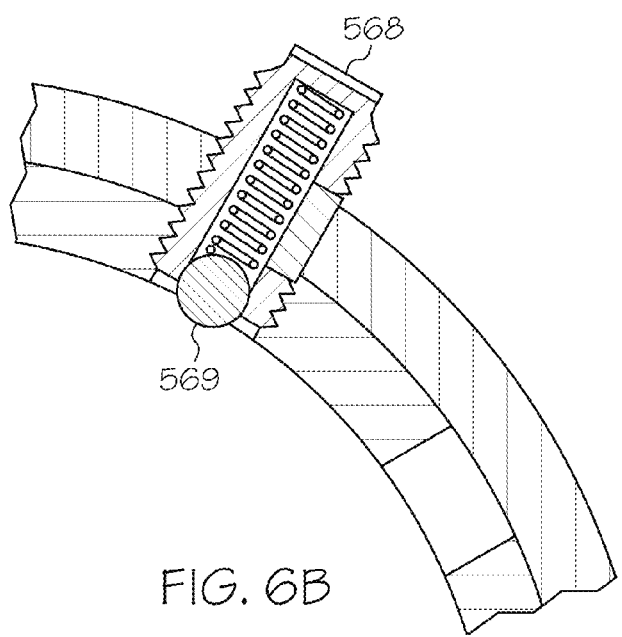
FIG. 6B schematically depicts a section view of a cartridge assembly for drawing glass ribbons, according to one or more embodiments shown or described herein.
Figure 7:
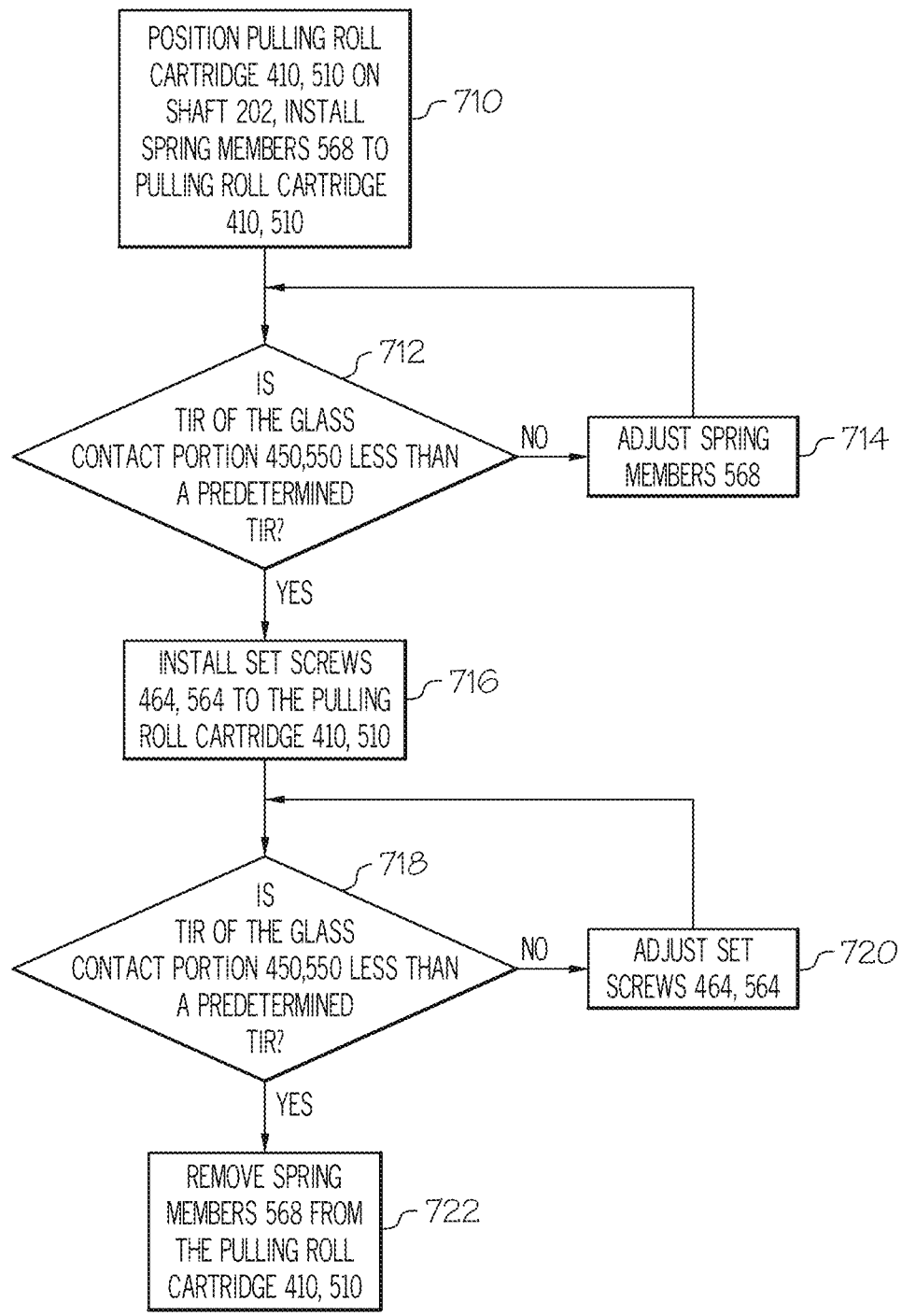
FIG. 7 depicts a logic flowchart for a method for positioning a cartridge assembly on a shaft, according to one or more embodiments shown or described herein.

Referring now to FIGS. 6 and 7, embodiments and methods for positioning pulling roll cartridges on a shaft are depicted. As described above with respect to FIGS. 4-5B, embodiments of the cartridge assemblies 410, 510 include a plurality of fastening members 464, 564. In embodiments of the cartridge assemblies 410, 510 that include a plurality of fastening members 464, 564, the cartridge assemblies 410, 510 include a plurality of threaded holes 566 proximate to the first end 414, 514 and the second end 416, 516. The plurality of fastening members 464, 564 is positioned within the threaded holes 566. As described above, when the plurality of fastening members 464, 564 are tightened, the plurality of fastening members 464, 564 engage the outer circumference 204 of the shaft member 202, coupling the cartridge assembly 410, 510 to the shaft member 202. When the cartridge assembly 410, 510 is coupled to the shaft member 202 by the plurality of fastening members 464, 564, the cartridge assembly 410, 510 may not be concentric with the shaft member 202. Lack of concentricity between the shaft member 202 and the cartridge assembly 410, 510, as well as variations in the glass contact portion 450, 550 contribute to run out of the glass contact portion 450, 550 (i.e., out-of-round or eccentricity of the glass contact portion 450, 550). Run out of the glass contact portion 450, 550 may damage the glass ribbon 148, potentially leading to manufacturing losses and increased manufacturing costs.

Referring to FIGS. 6A and 6B, to reduce the run out of the glass contact portion 450, 550, when the cartridge assembly 410, 510 is positioned on the shaft member 202, a plurality of spring members 568 may be installed in some of the plurality of threaded holes 566. Similar to the plurality of fastening members 464, 564 described above, the plurality of spring members 568 may selectively be tightened and translated in a radially inward direction, or loosened and translated in a radially outward direction. When the plurality of spring members 568 are tightened, the plurality of spring members 568 engage the outer circumference 204 of the shaft member 202.

Referring to FIG. 6B, in embodiments, the plurality of spring members 568 may include a ball nose spring plunger. The plurality of spring members 568 may include a ball 569 biased in a radially inward direction such that the ball 569 engages the outer circumference 204 of the shaft member 202. Because the ball 569 is biased in a radially inward direction, the ball 569 provides some compliance in the radial direction between the plurality of spring members 568 and the shaft member 202.

Referring to FIGS. 6A, 6B, and 7, a method for positioning a cartridge assembly 410, 510 on a shaft member 202 is depicted. In a first step 710, a cartridge assembly 410, 510 is positioned on the shaft member 202, and the plurality of spring members 568 are installed into the threaded holes 566 of the cartridge assembly 410, 510. The plurality of spring members 568 are tightened in the threaded holes 566 such that the plurality of spring members 568 engages the outer circumference 204 of the shaft member 202. At step 712, the total indicated run out (TIR) of the glass contact portion 450, 550 is determined. The TIR may be determined using a dial test indicator or similar displacement sensor. If the TIR of the glass contact portion 450, 550 is greater than a predetermined TIR, then at step 714, the plurality of spring members 568 are adjusted by tightening and/or loosening ones of the plurality of spring members 568. If the TIR of the glass contact portion 450, 550 is less than the predetermined TIR, then at step 716, the plurality of fastening members 464, 564 are installed into the threaded holes 566 of the cartridge assembly 410, 510 that do not have one of the plurality of spring members 568. The plurality of fastening members 464, 564 is tightened in the threaded holes 566 such that the plurality of fastening members 464 engages the outer circumference 204 of the shaft member 202. At step 718, the TIR of the glass contact portion 450, 550 is determined. If the TIR of the glass contact portion 450, 550 is greater than the predetermined TIR, then at step 720, the plurality of fastening members 464, 564 are adjusted by tightening and/or loosening ones of the plurality of fastening members 464, 564. If the TIR of the glass contact portion 450, 550 is less than the predetermined TIR, the at step 722, the plurality of spring members 568 may be removed from the threaded holes 566 of the cartridge assembly 410, 510 such that only the fastening members 464, 564 remain in the threaded holes 566. Alternatively, the plurality of spring members 568 may remain in the threaded holes 566 of the cartridge assembly 410, 510.

As described above, run out of the glass contact portion 450, 550 may damage the glass ribbon 148, potentially leading to discarded glass ribbon 148 and increased manufacturing costs. To prevent damage to the glass ribbon 148, in embodiments, the predetermined TIR may be less than about 0.020 inches. In another embodiment, the predetermined TIR may be less than about 0.010 inches. In yet another embodiment, the predetermined TIR may be less than 0.005 inches.

By adjusting the run out of the glass contact portion 450, 550 through the adjustment of spring members 568 and the fastening members 464, 564, the run out of the glass contact portion 450, 550 may be reduced without machining the glass contact portion 450, 550 after the cartridge assembly 410, 510 is installed to the shaft member 202.

It should now be understood that cartridge assemblies according to the present specification may be used on glass web pulling rolls. In embodiments, cartridge assemblies may be coupled to a shaft by a clamping portion or by a plurality of fastening members. The clamping portion and the plurality of fastening members may be selectively tightened or loosened, selectively allowing the cartridge assemblies to slide with respect to the shaft in a cartridge axial direction. Because the cartridge assemblies may slide with respect to the shaft in the cartridge axial direction, the position of the cartridge on the shaft in the cartridge axial direction may be adjusted. Additionally, the cartridge assemblies may be easily removed from the shaft so that the cartridge assemblies may be removed and replaced. Because the cartridge assemblies may be easily removed, the process down time associated with replacing pulling rolls may be reduced, resulting in decreased manufacturing losses.

Further, the use of fastening members to couple the cartridge assemblies to the shaft allows for the run out of the glass contact portion of the cartridge assembly to be adjusted on the shaft of the pulling roll without machining the glass contact portion.

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which in turn, can include one or more specific embodiments. It is to be understood that the embodiments may or may not overlap with each other. Thus, part of one embodiment, or specific embodiments thereof, may or may not fall within the ambit of another, or specific embodiments thereof, and vice versa.

Thus, a first aspect of the present disclosure is related to a cartridge assembly. The cartridge assembly includes a hub portion having a first end and a second end positioned opposite the first end in a cartridge axial direction. The cartridge assembly further includes a first retaining ring portion including a first snap ring and a first retaining ring member, the first retaining ring portion positioned proximate to the first end of the hub portion. The cartridge assembly further includes a second retaining ring portion including a second snap ring and a second retaining ring member positioned proximate to the second end of the hub portion. The cartridge assembly further includes a plurality of disc elements positioned between the first retaining ring portion and the second retaining ring portion, where the plurality of disc elements has an outer diameter that is greater than an outer diameter of the first retaining ring portion and the second retaining ring portion. The cartridge assembly further includes a plurality of fastening members positioned at the first end and the second end of the hub portion, the plurality of fastening members extending radially inward from the hub portion.

In certain embodiments of the first aspect of the present disclosure, the plurality of disc elements further includes a plurality of spring elements.

In certain embodiments of the first aspect of the present disclosure, the cartridge assembly further includes a first biasing member portion positioned between the plurality of disc elements and the first retaining ring portion, where the first biasing member portion applies a compressive force to the plurality of disc elements.

In certain embodiments of the first aspect of the present disclosure, the cartridge assembly includes a second biasing member portion positioned between the plurality of disc elements and the second retaining ring portion, where the second biasing member portion applies a compressive force to the plurality of disc elements.

In certain embodiments of the first aspect of the present disclosure, the first biasing member and the second biasing member include spring washers.

In certain embodiments of the first aspect of the present disclosure, the cartridge assembly includes a plurality of limiters positioned between the first retaining ring portion and the second retaining ring portion, where the plurality of limiters has an outer diameter that is less than the outer diameter of the plurality of disc elements.

In certain embodiments of the first aspect of the present disclosure, individual ones of the plurality of limiters and individual ones of the plurality of disc elements are alternately arranged on the hub portion.

A second aspect of the present disclosure is related to a glass web pulling roll. The glass web pulling roll includes a shaft member and a cartridge assembly positioned on the shaft member. The cartridge assembly includes a hub portion having a first end and a second end positioned opposite the first end in a cartridge axial direction. The cartridge assembly further includes a first retaining ring portion including a first snap ring and a first retaining ring member, the first retaining ring portion positioned proximate to the first end of the hub portion. The cartridge assembly further includes a second retaining ring portion including a second snap ring and a second retaining ring member positioned proximate to the second end of the hub portion. The cartridge assembly further includes a plurality of disc elements positioned between the first retaining ring portion and the second retaining ring portion, where the plurality of disc elements has an outer diameter that is greater than an outer diameter of the first retaining ring portion and the second retaining ring portion. The cartridge assembly further includes a plurality of fastening members positioned at the first end and the second end of the hub portion, the plurality of fastening members extending radially inward from the hub portion.

In certain embodiments of the second aspect of the present disclosure, the plurality of disc elements further includes a plurality of spring elements.

In certain embodiments of the second aspect of the present disclosure, the cartridge assembly further includes a first biasing member portion positioned between the plurality of disc elements and the first retaining ring portion, where the first biasing member portion applies a compressive force to the plurality of disc elements.

In certain embodiments of the second aspect of the present disclosure, the cartridge assembly includes a second biasing member portion positioned between the plurality of disc elements and the second retaining ring portion, where the second biasing member portion applies a compressive force to the plurality of disc elements.

In certain embodiments of the second aspect of the present disclosure, the first biasing member and the second biasing member include spring washers.

In certain embodiments of the second aspect of the present disclosure, the cartridge assembly includes a plurality of limiters positioned between the first retaining ring portion and the second retaining ring portion, where the plurality of limiters has an outer diameter that is less than the outer diameter of the plurality of disc elements.

In certain embodiments of the second aspect of the present disclosure, individual ones of the plurality of limiters and individual ones of the plurality of disc elements are alternately arranged on the hub portion.

A third aspect of the present disclosure is related to a method for drawing a glass web including melting glass batch materials to form molten glass, forming the molten glass into the glass web with a fusion draw machine comprising an inlet, a forming vessel, and a pulling roll, and drawing the glass web through the pulling roll. The pulling roll includes a shaft member and a cartridge assembly positioned on the shaft member. The cartridge assembly includes a hub portion having a first end and a second end positioned opposite the first end in a cartridge axial direction. The cartridge assembly further includes a first retaining ring portion including a first snap ring and a first retaining ring member, the first retaining ring portion positioned proximate to the first end of the hub portion. The cartridge assembly further includes a second retaining ring portion including a second snap ring and a second retaining ring member positioned proximate to the second end of the hub portion. The cartridge assembly further includes a plurality of disc elements positioned between the first retaining ring portion and the second retaining ring portion, where the plurality of disc elements has an outer diameter that is greater than an outer diameter of the first retaining ring portion and the second retaining ring portion. The cartridge assembly further includes a plurality of fastening members positioned at the first end and the second end of the hub portion, the plurality of fastening members extending radially inward from the hub portion.

In certain embodiments of the third aspect of the present disclosure, the plurality of disc elements further includes a plurality of spring elements.

In certain embodiments of the third aspect of the present disclosure, the pulling roll further includes a first biasing member portion positioned between the plurality of disc elements and the first retaining ring portion and a second biasing member portion positioned between the plurality of disc elements and the second retaining ring portion, where the first biasing member portion and the second biasing member portion apply a compressive force to the plurality of disc elements.

In certain embodiments of the third aspect of the present disclosure, the first biasing member portion and the second biasing member portion include spring washers.

In certain embodiments of the third aspect of the present disclosure, the pulling roll further includes a plurality of limiters positioned between the first retaining ring portion and the second retaining ring portion, where the plurality of limiters has an outer diameter that is less than the outer diameter of the plurality of disc elements.

A fourth aspect of the present disclosure is related to a cartridge assembly. The cartridge assembly includes a hub portion having a first end and a second end positioned opposite the first end in a cartridge axial direction. The cartridge assembly further includes a flange portion positioned proximate to the first end of the hub portion. The cartridge assembly further includes a retaining ring portion including a snap ring and a retaining ring member positioned proximate to the second end of the hub portion. The cartridge assembly further includes a glass contact portion positioned between the flange portion and the retaining ring portion, where the glass contact portion has an outer diameter that is greater than an outer diameter of the flange portion and the retaining ring portion. The cartridge assembly further includes a plurality of fastening members positioned at the first end and the second end of the hub portion, the plurality of fastening members extending radially inward from the hub portion.

In some embodiments of the fourth aspect of the present disclosure, the glass contact region is compressed in a cartridge axial direction between the flange portion and the retaining ring portion by a force that is greater than 2000 lbf.

A fifth aspect of the present disclosure is related to a glass web pulling roll. The glass web pulling roll includes a shaft member and a cartridge assembly. The cartridge assembly includes a hub portion having a first end and a second end positioned opposite the first end in a cartridge axial direction. The cartridge assembly further includes a flange portion positioned proximate to the first end of the hub portion. The cartridge assembly further includes a retaining ring portion including a snap ring and a retaining ring member positioned proximate to the second end of the hub portion. The cartridge assembly further includes a glass contact portion positioned between the flange portion and the retaining ring portion, where the glass contact portion has an outer diameter that is greater than an outer diameter of the flange portion and the retaining ring portion. The cartridge assembly further includes a plurality of fastening members positioned at the first end and the second end of the hub portion, the plurality of fastening members extending radially inward from the hub portion.

In some embodiments of the fifth aspect of the present disclosure, the glass contact region is compressed in a cartridge axial direction between the flange portion and the retaining ring portion by a force that is greater than 2000 lbf.

A sixth aspect of the present disclosure is related to a method for drawing a glass web including melting glass batch materials to form molten glass, forming the molten glass into the glass web with a fusion draw machine comprising an inlet, a forming vessel, and a pulling roll, and drawing the glass web through the pulling roll. The pulling roll includes a shaft member and a cartridge assembly positioned on the shaft member. The cartridge assembly includes a hub portion having a first end and a second end positioned opposite the first end in a cartridge axial direction. The cartridge assembly further includes a flange portion positioned proximate to the first end of the hub portion. The cartridge assembly further includes a retaining ring portion including a snap ring and a retaining ring member positioned proximate to the second end of the hub portion. The cartridge assembly further includes a glass contact portion positioned between the flange portion and the retaining ring portion, where the glass contact portion has an outer diameter that is greater than an outer diameter of the flange portion and the retaining ring portion. The cartridge assembly further includes a plurality of fastening members positioned at the first end and the second end of the hub portion, the plurality of fastening members extending radially inward from the hub portion.

In some embodiments of the sixth aspect of the present disclosure, the glass contact region is compressed in a cartridge axial direction between the flange portion and the retaining ring portion by a force that is greater than 2000 lbf.

A seventh aspect of the present disclosure is related to a cartridge assembly. The cartridge assembly includes a hub portion having a first end and a second end positioned opposite the first end in a cartridge axial direction. The cartridge assembly further includes a flange portion positioned proximate to the first end of the hub portion. The flange portion includes a rim portion and a clamping portion. The cartridge assembly further includes a retaining ring portion including a snap ring and a retaining ring member positioned proximate to the second end of the hub portion. The cartridge assembly further includes a glass contact portion positioned between the flange portion and the retaining ring portion, where the glass contact portion has an outer diameter that is greater than an outer diameter of the flange portion and the retaining ring portion.

In some embodiments of the seventh aspect of the present disclosure, the clamping portion extends partially around a circumference of the hub portion.

In some embodiments of the seventh aspect of the present disclosure, the clamping portion includes a concave surface.

In some embodiments of the seventh aspect of the present disclosure, cartridge assembly further includes a key portion that is positioned at least partially within a keyway of the hub portion.

In some embodiments of the seventh aspect of the present disclosure, the glass contact region is compressed in a cartridge axial direction between the flange portion and the retaining ring portion by a force that is greater than 2000 lbf.

An eighth aspect of the present disclosure is related to a pulling roll. The pulling roll includes a shaft member and a cartridge assembly positioned on the shaft member. The cartridge assembly includes a hub portion having a first end and a second end positioned opposite the first end in a cartridge axial direction. The cartridge assembly further includes a flange portion positioned proximate to the first end of the hub portion. The flange portion includes a rim portion and a clamping portion. The cartridge assembly further includes a retaining ring portion including a snap ring and a retaining ring member positioned proximate to the second end of the hub portion. The cartridge assembly further includes a glass contact portion positioned between the flange portion and the retaining ring portion, where the glass contact portion has an outer diameter that is greater than an outer diameter of the flange portion and the retaining ring portion.

In some embodiments of the eighth aspect of the present disclosure, the clamping portion extends partially around a circumference of the hub portion.

In some embodiments of the eighth aspect of the present disclosure, the clamping portion includes a concave surface that engages an outer circumference of the shaft member.

In some embodiments of the eighth aspect of the present disclosure, cartridge assembly further includes a key portion that is positioned at least partially within a keyway of the hub portion.

In some embodiments of the eighth aspect of the present disclosure, the shaft member includes a key slot and the key portion is positioned at least partially within the key slot.

In some embodiments of the eighth aspect of the present disclosure, the key slot extends a length l along the shaft member.

In some embodiments of the eighth aspect of the present disclosure, the glass contact region is compressed in a cartridge axial direction between the flange portion and the retaining ring portion by a force that is greater than 2000 lbf.

A ninth aspect of the present disclosure is related to a method for drawing a glass web including melting glass batch materials to form molten glass, forming the molten glass into the glass web with a fusion draw machine comprising an inlet, a forming vessel, and a pulling roll, and drawing the glass web through the pulling roll. The pulling roll includes a shaft member and a cartridge assembly positioned on the shaft member. The cartridge assembly includes a hub portion having a first end and a second end positioned opposite the first end in a cartridge axial direction. The cartridge assembly further includes a flange portion positioned proximate to the first end of the hub portion. The flange portion includes a rim portion and a clamping portion. The cartridge assembly further includes a retaining ring portion including a snap ring and a retaining ring member positioned proximate to the second end of the hub portion. The cartridge assembly further includes a glass contact portion positioned between the flange portion and the retaining ring portion, where the glass contact portion has an outer diameter that is greater than an outer diameter of the flange portion and the retaining ring portion.

In some embodiments of the ninth aspect of the present disclosure, the clamping portion extends partially around a circumference of the hub portion.

In some embodiments of the ninth aspect of the present disclosure, the clamping portion includes a concave surface that engages an outer circumference of the shaft member.

In some embodiments of the ninth aspect of the present disclosure, cartridge assembly further includes a key portion that is positioned at least partially within a keyway of the hub portion.

In some embodiments of the ninth aspect of the present disclosure, the shaft member includes a key slot and the key portion is positioned at least partially within the key slot.

In some embodiments of the ninth aspect of the present disclosure, the key slot extends a length l along the shaft member.

In some embodiments of the ninth aspect of the present disclosure, the glass contact region is compressed in a cartridge axial direction between the flange portion and the retaining ring portion by a force that is greater than 2000 lbf.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A cartridge assembly for a glass web pulling roll, the cartridge assembly comprising:
    a hub portion having a first end and a second end positioned opposite the first end in a cartridge axial direction;
    a first retaining ring portion comprising a first snap ring and a first retaining ring member, the first retaining ring portion positioned about the hub portion proximate to the first end of the hub portion;
    a second retaining ring portion comprising a second snap ring and a second retaining ring member, the second retaining ring portion positioned about the hub portion proximate to the second end of the hub portion;
    a plurality of disc elements positioned between the first retaining ring portion and the second retaining ring portion and about the hub portion, wherein the plurality of disc elements has an outer diameter that is greater than an outer diameter of the first retaining ring portion and the second retaining ring portion; and
    a plurality of fastening members positioned at the first end and the second end of the hub portion, the plurality of fastening members extending radially inward through respective openings in the hub portion to connect the hub portion of the cartridge assembly at opposite ends of the plurality of disc elements directly to a shaft member by engagement therewith.

2. The cartridge assembly of claim 1, wherein at least one disc element of the plurality of disc elements comprises a plurality of spring elements arranged about the hub portion and that extend radially outward from the hub portion to an outer diameter of the at least one disc element, the plurality of spring elements biased radially outward and compliant radially inward to deflect radially inward when in contact with a glass web.

3. The cartridge assembly of claim 1, further comprising a first biasing member positioned between the plurality of disc elements and the first retaining ring portion, wherein the first biasing member applies a compressive force to the plurality of disc elements in the cartridge axial direction.

4. The cartridge assembly of claim 3, further comprising a second biasing member positioned between the plurality of disc elements and the second retaining ring portion, wherein the first biasing member and the second biasing member apply a compressive force to the plurality of disc elements in the cartridge axial direction.

5. The cartridge assembly of claim 4, wherein the first biasing member and the second biasing member comprise spring washers.

6. The cartridge assembly of claim 1, further comprising a plurality of limiters positioned between the first retaining ring portion and the second retaining ring portion, wherein the plurality of limiters has an outer diameter that is less than the outer diameter of the plurality of disc elements.

7. The cartridge assembly of claim 6, wherein individual ones of the plurality of limiters and individual ones of the plurality of disc elements are alternately arranged on the hub portion.

8. A glass web pulling roll comprising:
a shaft member;
a cartridge assembly positioned on the shaft member, the cartridge assembly comprising:
  a hub portion having a first end and a second end positioned opposite the first end in a cartridge axial direction;
  a first retaining ring portion comprising a first snap ring and a first retaining ring member, the first retaining ring portion positioned about the hub portion proximate to the first end of the hub portion;
  a second retaining ring portion comprising a second snap ring and a second retaining ring member, the second retaining ring portion positioned about the hub portion proximate to the second end of the hub portion;
  a plurality of disc elements positioned between the first retaining ring portion and the second retaining ring portion and about the hub portion, wherein the plurality of disc elements has an outer diameter that is greater than an outer diameter of the first retaining ring portion and the second retaining ring portion; and
  a plurality of fastening members positioned at the first end and the second end of the hub portion, the plurality of fastening members extending radially inward through respective openings in the hub portion to connect the hub portion of the cartridge assembly at opposite ends of the plurality of disc elements directly to a shaft member by engagement therewith.

9. The glass web pulling roll of claim 8, wherein at least one disc element of the plurality of disc elements comprises a plurality of spring elements arranged about the hub portion and that extend radially outward from the hub portion to an outer diameter of the at least one disc element, the plurality of spring elements biased radially outward and compliant radially inward to deflect radially inward when in contact with a glass web.

10. The glass web pulling roll of claim 8, further comprising a first biasing member positioned between the plurality of disc elements and the first retaining ring portion, wherein the first biasing member applies a compressive force to the plurality of disc elements in the cartridge axial direction.

11. The glass web pulling roll of claim 10, further comprising a second biasing member positioned between the plurality of disc elements and the second retaining ring portion, wherein the first biasing member and the second biasing member apply a compressive force to the plurality of disc elements in the cartridge axial direction.

12. The glass web pulling roll of claim 11, wherein the first biasing member and the second biasing member comprise spring washers.

13. The glass web pulling roll of claim 8, further comprising a plurality of limiters positioned between the first retaining ring portion and the second retaining ring portion, wherein the plurality of limiters has an outer diameter that is less than the outer diameter of the plurality of disc elements.

14. The glass web pulling roll of claim 13, wherein individual ones of the plurality of limiters and the individual ones of the plurality of disc elements are alternately arranged on the hub portion.

* * * * *